United States Patent Office 2,939,830
Patented June 7, 1960

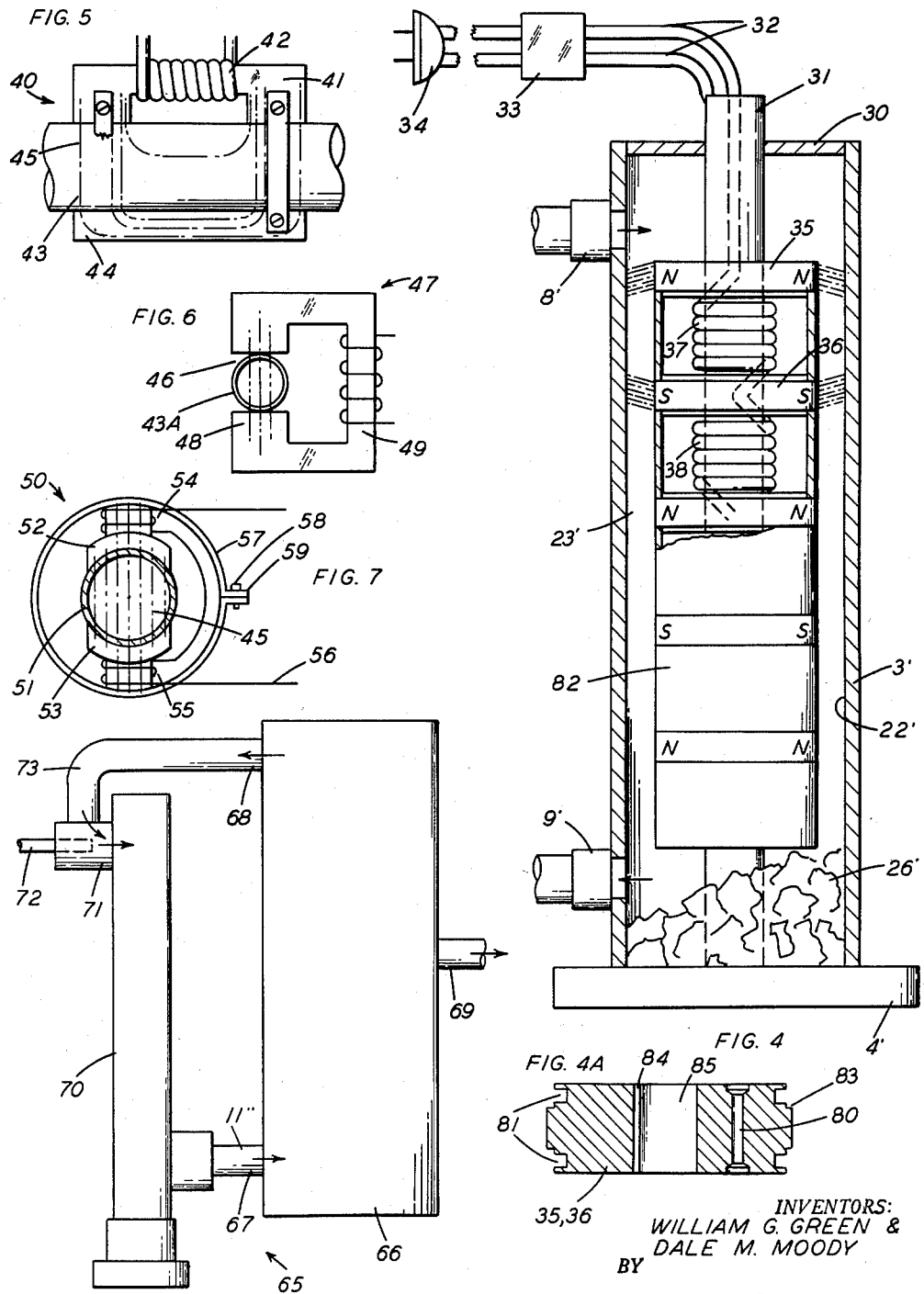

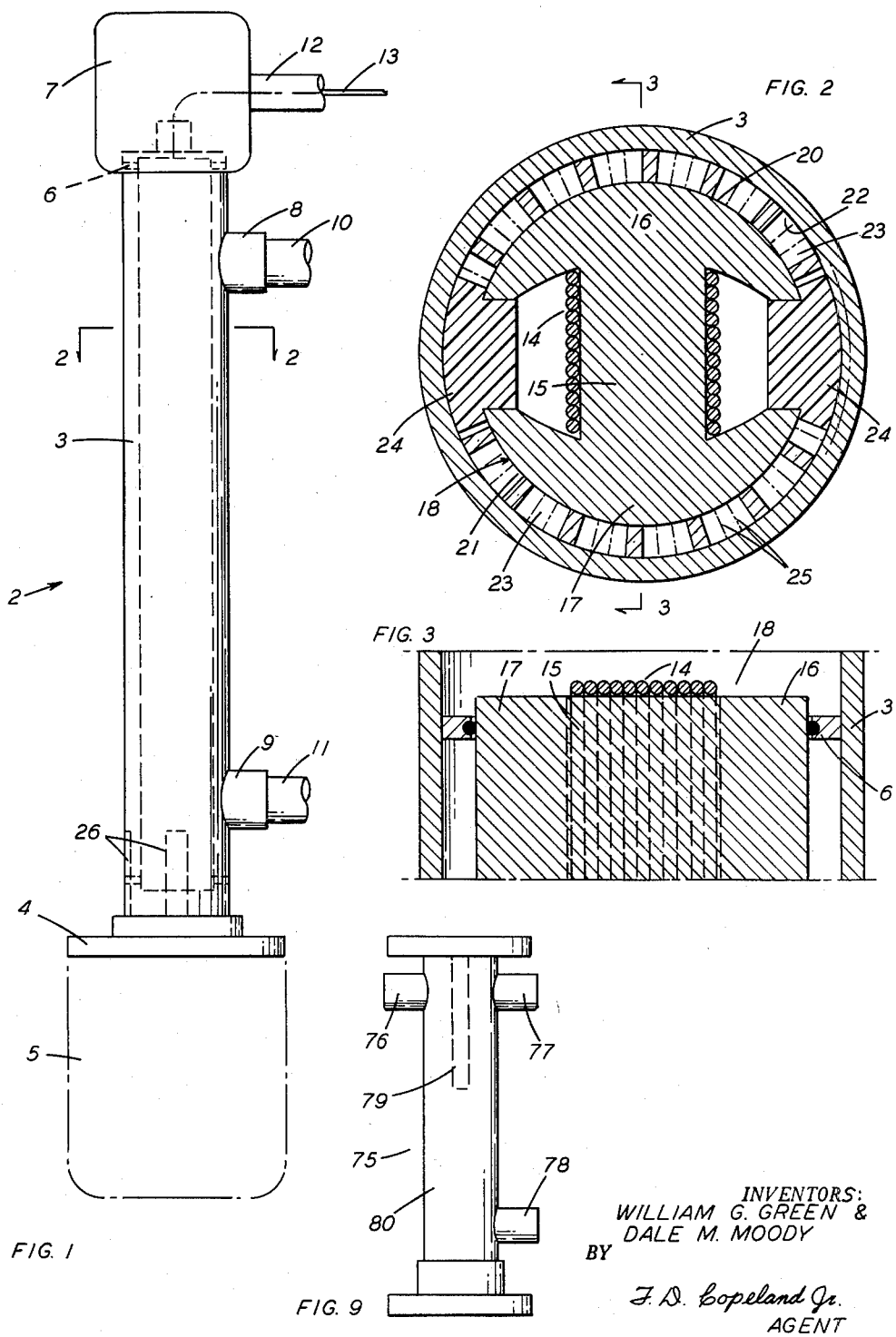

2,939,830

WATER CONDITIONER

William G. Green, 1102 N. Mingo Road, and Dale M. Moody, P.O. Box 4035, both of Tulsa, Okla.

Filed Oct. 4, 1956, Ser. No. 613,976

7 Claims. (Cl. 204—248)

This invention relates to water conditioning equipment and more particularly to a device of this type which conditions the water without employing any chemical means for its operation.

The primary object of this invention is to provide an electrically operated water conditioner which will reduce the "hardness" of water treated, reduce the scale and corrosion in water pipes carrying the treated water, reduce the tendency of the water to form rust on metal parts, provide a water which is more potable for human or animal consumption, and to increase the "wetting" characteristics of the water for laundry and other industrial and agricultural purposes.

The secondary object of this invention is to provide an improved water conditioner which will neutralize electrically unbalanced molecules in the water to be treated at a greater rate and with greater thoroughness than possible by previous means.

An additional object is to provide an electrically operated water conditioner which will accelerate the ions in the water and cause them to strike the walls of the pipe and other metallic objects so as to cause the positively charged ions to strike free electrons so to neutralize the charge on the ion and greatly reduce the tendency of these ions to pile up or stick to the pipe and cause scale or corrosion.

A still further object is to provide a means within water conditioner so constructed that alternating current may be employed internally to accelerate and vibrate the charged ions to greatly increase their chances of becoming neutralized and thus provide a neutral or treated water.

Another object is to provide direct current operated water conditioner.

When water falls from the sky in the form of rain or snow, in most cases it is almost entirely free of foreign substances, being composed entirely of hydrogen and oxygen in the form of $H_2O$. This is a "neutral" substance, i.e., it has an equal number of positive charges and negative charges in the molecule of water. In this form, that is, neutral, the pure water has very little effect upon any other neutral metal substance of the common variety such as steel, iron, copper, tin, brass, etc., generally used for piping and industrial or domestic vessels.

As is well known, the pH scale runs from 1, on the acid end, up through 7 which is neutral (pure water) on through 14 which is most highly alkaline. Starting from 7, going one number toward 1, that is 6, the substance (acid) is characterized by having an excess of electrons, or negative charges of electricity. This is called ionization, and the molecules of acid are said to be negatively ionized. From 6 to 5, the number of ions increases by ten times, and from 5 to 4, 4 to 3, etc., each time the number of ions increased by ten times. This considerable number of excessively negatively charged ions makes for a very unstable or corrosive condition. On the other hand, when going up the pH scale toward 8, the materials are characterized by a number of molecules which are deficient in one or more electrons, and are, as a consequence, positively charged. These positive ions are sometimes called anions. They likewise increase by ten times each step up the scale.

Normally, the pure rain or melted snow water on its way into the lakes, streams and reservoirs, will absorb a certain amount of whatever minerals exists in or near the earth's surface. Normally, also, these minerals are the alkalis—that is, they are more or less deficient in negative particles, and are consequently positively charged. Both these characteristics are of interest here.

Whenever any group of molecules adjacent each other is equally deficient in electrons, under cetain conditions there is a "latching in" of the molecules. That is, temporarily the electrons from one molecule will be borrowed by another. The resulting differential charges causes a progressive movement of the borrowed electrons around the group of molecules, producing a "lattice" or rigid mechanical grouping of those molecules. This is the simple process of crystallization.

This crystallization does not normally take place except at or near the saturation point of the minerals within the water. This may occur if there is evaporation of the water, as for example, in the cooling towers of air conditioning units, or in steel boilers, or any open heated vessels.

The crystallization may be prevented by neutralizing the ions. This may be done chemically or electrically. Actually, what is done is all electrical, but is simply a different physical means. In both cases, the deficient electrons are supplied from another source, and are caused to combine to neutralize the molecules.

Heretofore water has been treated for many years by the addition of hydrochloric acid (HCl) or sulphuric acid ($H_2SO_4$). While for one or two treatments, this is a quick and cheap method, it is dangerous, in that constant attention is required in order to get just the right amount to neutralize the solution, and not to acidify the water to the point of destroying some of the vessels and piping.

In spite of the fact that alkaline waters are somewhat deficient in electrons, as far as certain molecules of the solutes are concerned, there are usually enough free electrons in other molecules to approximately balance or neutralize the water, however, the space factor may be, and usually is sufficient to prevent the deionization or neutralization. Also, the walls of the vessel, provided they are not covered with some inert, neutral or ionized material such as scale, contain many free electrons, provided the vessel is of any metal normally classed as a "good" electrical conductor.

Therefore, if any ion is accelerated sufficiently to cause it to travel abruptly in any direction, or to strike the walls of the vessel, or any metallic object, the chance of it striking a molecule with free electrons is greatly increased. If the ion be accelerated rapidly in a number of directions or rapidly back and forth in a vibratory fashion, over a distance of 2 feet or more, its chances of striking a molecule with free electrons, or free electrons in the liquid, or the "solid" wall material, are increased almost to the 100% limit. Further if a supply of material containing many free electrons is introduced into the system, where the molecules of water will strike them, this deionization will be further expedited.

It is well known that "energy can neither be created nor destroyed, but may be transformed from one kind to another." All chemical and physical processes require the expenditure of energy of one kind or another, and this process does require the expenditure or transformation of energy. As is well known, there is a "heat of precipitation," and heat or energy is required to produce ionization, and deionization. Therefore, some form of energy is required to cause this deionization.

It has been found by experiment that a flow of water past a permanent magnet, through a ¼" gap, should not exceed 4.3 feet/sec.; if there are several groups of such permanent fields, in order for the deionization to be accomplished. This would assume 10 changes in polarity. However, with a pair of poles, built similar to the poles of a generator armature, 24 inches in length, energized with 60 cycles per second, alternating current, the number of complete reversals, assuming the same maximum rate of flow of 4.3 linear feet per second, would be 27.9. Thus, for the same amount of wire, the same length, and the same magnetic gap, the number of polarity changes would be 2.79 times that of a permanent magnet arrangement, and the efficiency would be that much greater. The use of higher frequency current, produced by alternators, or choppers, or oscillators, would, of course, increase the number of reversals. By actual experiment, however, the use of 60 cycle A.C. appears to be the most practical and economical solution.

For many years it has been known that some material higher in the electromotive series than iron, such as aluminum or magnesium, when inserted in a hot-water heater or boiler, would reduce or eliminate the corrosion to the heater and piping (which rusting or corrosion is not to be confused with the formation of scale or crystals of alkalis), and it has been found to be of value to insert an ingot of magnesium in the base of this instrument for this purpose.

These and other objects and advantages will be apparent from an examination of the following specification and drawing, in which:

Fig. 1 is a side elevational view of one embodiment of the water conditioner of this invention.

Fig. 2 represents a cross-sectional plan view taken transversely through the water pipe section along the lines 2—2 of Fig. 1 of the water conditioner of this invention.

Fig. 3 is a cross-sectional elevational view taken along the lines 3—3 of Fig. 2.

Fig. 4 is a cross-sectional elevational view of the second embodiment, and one which employs direct current as the operating power.

Fig. 5 is a side elevational view of a third embodiment of the device of Fig. 1, which may employ either A.C. or D.C. power.

Fig. 6 is an outline drawing showing the theory envolved in the fourth modified embodiment of the device of this invention.

Fig. 7 is a cross-sectional view of a commercial structure of the fourth embodiment of the invention.

Fig. 8 is an outline drawing of a fifth embodiment of the invention and this embodiment employs a recirculation system as an auxiliary means of conditioning the water.

Fig. 9 is an outline drawing of a preferred in-line settling tank which may be used with the water conditioner of this invention to remove foreign particles from the water after they have been deionized.

Referring now more particularly to the characters of reference of the drawings, it will be observed in Figs. 1 and 2 that the water conditioner indicated generally at 2 consists basically of a length of pipe 3, preferably of steel or other ferrous material extending vertically from a flange 4 at its lower end, for connection with a trap or settling tank 5 shown in phantom outline, upward to a sealed connection 6 with conduit box 7. Intermediate this length are spaced couplings 8 and 9 which receive an inlet pipe 10 and outlet pipe 11 respectively of the water system to be conditioned. Conduit pipe 12 carries electrical wire 13 from a power source (not shown) to conduit box 7 and then to coils 14 which encircle the center core 15 which connects north pole 16 and south pole 17 of electro-magnet 18.

Pole pieces 16 and 17 are arcuate in shape having outer circumferences 20 and 21 concentric with the inside curvature 22 of pipe 3. This construction leaves a small water gap 23 between the circumferences 20 and 21 and the inside curvature 22. Adjacent to and joining the free ends of north pole 16 and south pole 17 a vertically extending non-magnetic and non-conducting spacer 24 (plastic makes an ideal spacer material) engages both poles and also the inside curvature 22 of pipe 3 to both hold the magnet assembly in place within pipe 3 and also prevent the water to be treated from passing down through this area which contains virtually no lines of magnetic flux 25. A plurality of thin radial spacers divide the water gap 23 into longitudinal sections. As indicated in Fig. 2 the lines of magnetic flux 25 pass through the water gap 23 and not through the radial spacers.

Due to the shape of the poles and the current applied through coil 14, a very strong magnetic field or flux 25 is present in water gap 23 for the entire length of the assembly. By using alternating current (A.C.) in the coil 14 a very agitated and vibrating flux 25 is provided in gap 23. This is highly desirable as it will accelerate the bombardment of the ions (and anions) in the water as the water passes through gap 23 so that by the time the water has passed from inlet pipe 10 to outlet pipe 11 virtually all of the electrically charged particles (both acid and alkali atoms and radicals) will have come in contact with particles of opposite polarity either in the water or in the pipe walls 3 or the magnesium source 26 at the lower end of pipe 3 so that the charged particles will be neutralized and thus be dormant against attacking and corroding pipe walls, vessels, boiler tubes, etc. in the water system. Much of the foreign matter in the water and even that which was adhering to the pipe walls of pipe 10 before the installation of water conditioner 2 will become dislodged and fall due to gravity into tank 5 which may be periodically cleaned out.

The direct current embodiment of Fig. 4 consists basically of a vertical ferrous material pipe 3' which extends from a lower settling tank flange 4' to an upper plate 30 which seals off pipe 3' and downwardly extending hollow center post 31 which carries D.C. wires 32 from a transformer-rectifier unit 33 which may be plugged into a standard 110 v. 60 cycle, A.C. power supply. Center post 31 includes a series of spaced circular pole disks 35 and 36 which become north and south poles respectively upon excitation of coils 37 and 38 between the disks on post 31. One of the wires 32 may be grounded to the external housing at top plate 30 and post 31, and the other wire 32 may be grounded to pipe 3' near the bottom to complete the D.C. circuit. An inlet coupling 8' installed near the top of pipe 3' and an outlet coupling 9' is installed near the bottom of the pipe so that the supply water must pass vertically down through the interior of pipe 3' and consequently through the narrow water gaps 23' between the pole disks 35, 36 and the inside curvature 22' of the pipe. Since alternate disks are alternately polarized due to the direction of the windings of alternate coils 37 and 38, any charged particles contained in the water passing through this gap is subjected to agitation and vibration and will be neutralized as previously described by the time it reaches outlet coupling 9'.

The embodiment of Fig. 5 may be installed on the external diameter of a pipe without requiring uncoupling any of the existing piping system and thus will serve certain particular installation requirements, as well as being slightly more economical than the prior embodiment. A C-shaped electromagnet 40 including a magnetizable core 41 and windings 42 which may be A.C. or D.C. is installed at one side of a pipe 43 and a flat plate 44 of magnetic material (such as iron) is attached to the opposite side whereby in operation the lines of flux 45 from magnet 40 will pass through pipe 43 and travel along plate and then pass back through the pipe to return to magnet 40. This embodiment may be used with any non-magnetic material pipe such as the present popular plastic pipe.

The outline drawing of Fig. 6 shows the theory employed in the embodiment shown in Fig. 7 in which the entire gap 46 of a C-shaped magnet 47 is filled by a non-magnetic material pipe 43A so that the water or other fluid inside of pipe 43A is subject to a heavy flux 48 from the magnet 47 as it bridges gap 46 before returning to winding leg 49.

The device shown in Fig. 7 utilizes the principle shown in Fig. 6 to provide a very effective compact water conditioner unit 50 which is very appropriate for an installation such as on an automotive radiator hose 51. The opposed magnetic poles 52 and 53 are energized by oppositely turned windings 54 and 55 which are energized by leads 56 to the automotive generator or battery (not shown). The pole pieces 52 and 53 are held in place by a magnetic material strap or housing 57 which is tightened securely in place by a bolt 58 engaging strap ears 59. Strap 57 provides a return path for the flux 45" in the same manner that leg 49 of Fig. 6 functions.

The embodiment 65 shown in Fig. 8 employs a recirculation tank 66 with an inlet fitting 67, a recirculation fitting 68 and an outlet fitting 69. The water conditioner tube 70 may correspond to either Fig. 2 or Fig. 4 except that its supply fitting 71 forms a jet chamber with supply pipe 72 so that water in recirculating pipe 73 is actually sucked into fitting 71 and consequently tube 70 for reconditioning. One very distinct advantage of this embodiment and also the embodiment of Fig. 7 when the latter is used on a radiator hose is that the continual recirculation of the fluid containing foreign particles will subject the particles to repeated applications of flux and their chances of becoming neutralized is thereby greatly increased. Due to the relative small diameter of a radiator hose such as 51 compared to the total volume of a radiator, the chances of neutralizing the fluid is very small where just one circulation is provided, but in an automotive hose, the water recirculates constantly and deionization will take place in a matter of time with even relatively small units 50 and very small currents in leads 56.

The settling tank 75 shown in Fig. 9 may be used on the outlet line of any of the embodiments of the water conditioner of this invention. The upper fittings 76 and 77 are installed directly in line with the outlet supply from a water conditioner, and the lower fitting 78 is for drainage purposes. A downwardly extending baffle 79 is installed between fittings 76 and 77 so that the course of water therebetween dips down and the relatively heavy foreign particles drop to the bottom of housing 80 and settle there. By closing valves (not shown) in lines 76 and 78, the tank 75 may be cleaned out when required.

Fig. 4A shows an improved pole disk 35 or 36 which may be used with a solid center post 31 and in which the electric wire 32 may be fed through opening 80 in passing from one coil 37 to the next coil 38. The disk 35, 36 also includes O-ring grooves 81 to seal the interior of brass spacers 82, and offset 83 provides an accurate spacing ledge. Keyway 84 is used to align center opening 85 on post 31'.

From the foregoing description it will be readily seen that there has been produced a device which substantially fulfills the objects of this invention as set forth herein. The invention is not limited to the exemplary constructions herein shown and described, but may be made in many ways within the scope of the appended claims.

What is claimed is:

1. A water conditioner comprising: a magnetic material housing, a water supply inlet on said housing, an outlet on said housing at a spaced distance from said inlet, a single magnetic pole piece extending substantially between said inlet and outlet, a sealing means on said housing, current carrying means extending internally and axially through said housing sealing means and engaging said magnetic means for energizing same, and means for connecting said current carrying means with an A.C. supply source.

2. A water conditioner comprising: a magnetic material housing, a water supply inlet on said housing, a water supply outlet on said housing at a spaced distance from said inlet, a pole piece inserted in said housing and extending substantially between said outlet and inlet; at least two poles on said pole piece, a core connecting said poles, a water gap between said poles and said housing, sealing means on said housing, an insulated electric wiring extending through said sealing means and wrapping around said core to form a longitudinal coil on said pole piece whereby a current in said wiring will activate said poles to emit magnetic flux at right angles therefrom and across said water gap to said housing to pass through the water in said water gap.

3. A water conditioner comprising: a magnetic material housing, a water supply inlet and a water supply outlet on said housing at a spaced distance from said inlet, a solid, generally circular H-shaped pole piece inserted in said housing and extending substantially between said outlet and inlet, at least two poles on said pole piece, a core connecting said poles, a water gap between said poles and said housing, sealing means on said housing, an insulated electric wiring extending through said sealing means and wrapping around said core to form a coil on said pole piece whereby a current in said wiring will activate said poles to emit magnetic flux across said water gap to condition water therein and on into said housing.

4. An electrically operated water conditioner, comprising: a magnetic material housing, a water supply inlet and a water supply outlet, on said housing at a spaced distance from said inlet, an electromagnet inserted in said housing, and extending substantially between said inlet and outlet, at least two poles on said electromagnet, a core connecting said poles, a water gap between said poles and said housing, a series of non-magnetic, conducting material baffles inserted longitudinally in said water gap, an A.C. coil on said core, and means to excite said coil to establish an alternating flux in said water gap to agitate any ionized particles in said water supply and force certain of said particles against said baffles.

5. A water conditioner, comprising: a housing, a water supply inlet on said housing, a water supply outlet on said housing at a spaced distance from said inlet, a center post extending axially through said housing, magnetic material disks at spaced intervals on said post, a water gap between said disk and said housing, electric wiring coils in said intervals, each said coil being wound in an opposite direction from the next preceding coil to form alternate North and South poles in successive disks when said coils are electrically excited, and means to electrically excite said coils and cause said disks to emit magnetic flux into said water gap for conditioning any water therein.

6. An apparatus for treating water as in claim 5 having an anode in said housing located in the path of said water after it has passed substantially through said water gap, said anode being of a metal which is higher in the electromotive series than iron.

7. A water conditioner, comprising: a magnetic material housing, a water supply inlet on said housing, an outlet on said housing at a spaced distance from said inlet, a solid magnetic material H-shaped pole piece having a circular circumference with two interrupted openings extending longitudinally thru said housing, a non-magnetic spacer in each said interrupted opening to hold said pole piece in spaced concentric relation with said housing and thus provide an annular water gap therebetween; a coil of wire surrounding the center leg of said H-shaped piece, and sealing means to retain the water in said water gap and not elsewhere, and a second sealing means to permit a power lead to pass thru said housing and excite said coil to create a flux from said pole piece to said housing across said water gap at right angles thereto, and non-magnetic radial spacers extending longitudinally thru said water gap and across said gap between said pole piece and said housing, and a separate source of electrons inserted into said water gap near the outlet of said housing.

References Cited in the file of this patent

UNITED STATES PATENTS

| | | |
|---|---|---|
| 438,579 | Faunce et al. | Oct. 14, 1890 |
| 1,491,600 | Fernow | Apr. 22, 1924 |
| 2,317,774 | Kiek et al. | Apr. 27, 1943 |
| 2,452,220 | Bower | Oct. 26, 1948 |
| 2,596,743 | Vermeiren | May 13, 1952 |
| 2,652,925 | Vermeiren | Sept. 22, 1953 |

FOREIGN PATENTS

| | | |
|---|---|---|
| 306,986 | Switzerland | May 15, 1955 |

OTHER REFERENCES

"Corrosion," vol. 9, No. 8, August 1953, page 245.

Journal of the Electrochemical Society, vol. 10, No. 5, May 1954, page 129C.